Nov. 5, 1968  R. P. BOWLER ET AL  3,409,874

BACK UP WARNING SWITCH MEANS FOR VEHICLES

Filed April 11, 1966

INVENTORS
ROBERT P. BOWLER
JAMES P. MALONE
BY
*James P. Malone*

3,409,874
BACK UP WARNING SWITCH MEANS
FOR VEHICLES
Robert P. Bowler, 154 Clearmeadow Drive, East Meadow, N.Y. 11554, and James P. Malone, 1 Odell Court, Syosset, N.Y. 11791
Filed Apr. 11, 1966, Ser. No. 541,669
4 Claims. (Cl. 340—61)

This invention relates to back up warning means for vehicles and more particularly to extending tape type switch arrangements adapted to provide a warning when coming into contact with any object or person when the vehicle is being backed up.

Statistics have shown about 30% of vehicle accidents are caused by one vehicle backing up into another one for instance, when parking or manipulating in a parking lot. This situation is especially difficult for large trucks since they do not have bumpers which are adapted to contact automobile vehicle bumpers so that the grill or headlight of the automobile is often damaged.

The present invention comprises a simple and inexpensive means for warning the driver of a vehicle in sufficient time to stop his vehicle backing up before doing any damage or causing personal injury. Many personal injuries are caused by backing up especially in parking lots and garages.

The present invention generally comprises a tape switch which is mounted on a flexible member which extends transversely across the back of the vehicle and generally parallel to the rear bumper if there is one. The flexible member is mounted on a solenoid shaft. The solenoid is adapted to extend the flexible member for instance, about six inches beyond the vehicle bumper. The solenoid may be connected to the back up lights or to a switch which is linked to the reverse control lever. The tape switch is connected to the horn or other warning device on the vehicle.

Therefore, when the vehicle is placed in reverse the flexible member extends as the vehicle is being backed up and if the vehicle comes into contact with another vehicle, object or person, the tape switch will cause the horn to warn the driver in sufficient time to eliminate damage. It is estimated that about six to ten inches would be sufficient extension as vehicles are generally creeping at slow speed while backing up.

Accordingly, a principal object of the invention is to provide new and improved vehicle safety means.

Another object of the invention is to provide new and improved back up warning means for vehicles.

Another object of the invention is to provide new and improved back up warning means for vehicles to prevent personal injury.

Another object of the invention is to provide new and improved back up warning means for vehicles comprising a tape switch mounted on an extendable member.

Another object of the invention is to provide new and improved back up warning switch means comprising a solenoid mounted adjacent the rear bumper, said solenoid having an external shaft, said flexible member mounted on the end of said shaft, said flexible member extending generally parallel to said rear bumper, said flexible member being adapted to retract under said rear bumper when said solenoid is not energized, a tape type switch mounted on said flexible member, one side of said tape switch being connected to vehicle ground and the other side of said tape switch being connected to a warning means, said solenoid being connected to be energized when said vehicle is being backed up.

These and other objects of the invention will be apparent from the following specification and drawings of which:

Figure 1:
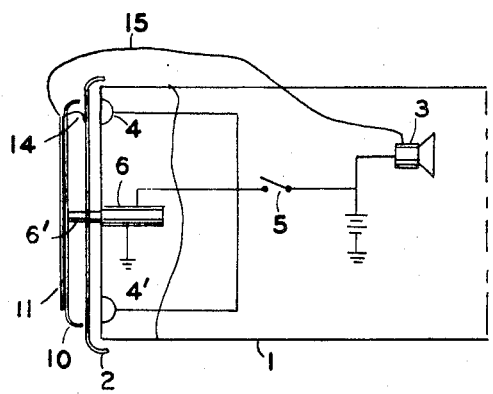
FIGURE 1 is a plan view of the embodiment of the invention.

Referring to the figures, there is shown a vehicle frame 1 having a rear bumper 2. The vehicle has a conventional horn 3 and back up lights 4, 4' which are connected to a light back up switch 5 in conventional manner.

The present invention generally comprises a solenoid 6 which may be clamped below and onto a centrally located bumper bracket 7. The solenoid is connected in parallel with the back up lights so that when the vehicle is placed in reverse and the back up lights go on, then the solenoid is energized. The solenoid has an armature shaft 6' which extends rearwardly in FIGURE 2, when the solenoid is energized. The shaft 6' is spring loaded into retracted position when the solenoid is not energized. Mounted on the shaft 6' is an elongated flexible member 10, which extends generally parallel to the rear bumper. In the retracted position, of the solenoid, the member 10 preferably nests under the rear bumper as shown in FIGURE 3.

The solenoid is preferably mounted on an angle so that the flexible member will extend upwardly directly in the rear of the rear bumper so that it will come into contact with any other vehicle bumper or object while the subject vehicle is being backed up.

Alternatively, the tape member could be hinge mounted on swinging brackets and actuated by the solenoid.

Mounted on the rear surface of the flexible member 10 is a tape switch 11 which extends along substantially the full length of the flexible member 10. The tape switch may be conventional as shown in a number of patents and generally comprise two tape like conductive members which are normally separated but which are adapted to be compressed by external pressure so as to complete a circuit. One side 14 of the tape switch is grounded and the other side 15 is connected to a warning device such as the horn 3 which may be the existing horn on the vehicle.

Figure 2:
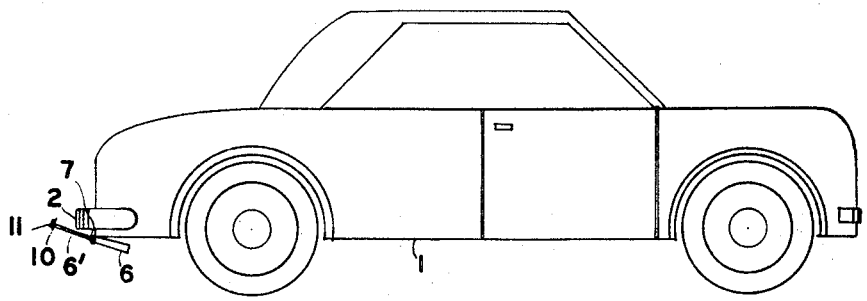
FIGURE 2 is a side view of FIGURE 1 with the solenoid in an extending position.
Figure 3:
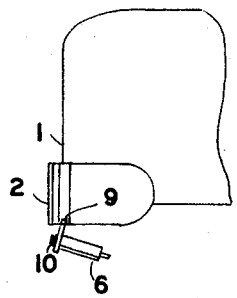
FIGURE 3 is a side view of FIGURE 1 with the solenoid in a retracted position.

The operation of the vehicle is as follows:

When the vehicle is placed in reverse gear, the solenoid will be energized and its armature will be extended as shown in FIGURE 2.

As the vehicle moves rearwardly if the flexible member and the tape switch member come into contact with an object, then the warning device will sound and warn the driver to stop immediately.

When the flexible member is in retracted position, it preferably nests under the rear bumper so that it will not be damaged by other vehicles contacting the rear bumper.

If the subject vehicle does not have a rear bumper for instance, in large trucks, the flexible member and the solenoid member may be mounted at any convenient support on the frame of the vehicle so as to extend out rearwardly preferably at the same height as an automobile bumper, since that would be the most common cause of accidents.

The present invention includes a solenoid, a flexible member and tape switch which may be provided in a kit form. The solenoid preferably has a clamp 9 for easy and adjustable attachments to the frame of the vehicle. The solenoid may be connected to the warning back up light switch or if the vehicle does not have back up lights, then to a switch which is adapted to be actuated by the reverse control lever.

One side of the tape switch may be easily connected to the frame and the other side of the tape switch may be connected to the warning device in the vehicle for instance the horn or to a warning light or other warning devices.

The present invention is not limited to backing up vehicles but may be applied to various other apparatus wherever a moving object or machine is likely to come into contact with a person or another object. The flexible member which mounts on the tape switch is light weight so that it will not cause any damage when coming into contact with another person or object.

Many modifications may be made by those who desire to practice the invention without departing from the scope thereof which is defined by the following claims.

We claim:

1. Back up warning switch means for a vehicle having a warning means comprising,
   a movable member mounted adjacent the rear bumper,
   means to move said member rearwardly of said bumper,
   a flexible member mounted on the end of said movable member,
   said flexible member extending generally parallel to said rear bumper when said moving means is moved rearwardly,
   said flexible member being adapted to be retracted when said moving means is not energized,
   a tape type switch mounted on said flexible member, one side of said tape switch being connected to vehicle ground,
   the other end of said tape switch being connected to said warning means, said moving means being connected to be energized when said vehicle is being backed up.

2. Apparatus as in claim 1 wherein said moving means is a solenoid.

3. Apparatus as in claim 2 wherein said vehicle has back up lights and said solenoid is connected in parallel with said back up lights.

4. Apparatus as in claim 1 wherein said warning means comprises an existing vehicle horn.

References Cited

UNITED STATES PATENTS

| | | | |
|---|---|---|---|
| 1,719,560 | 7/1929 | Purcell | 340—61 |
| 2,444,635 | 7/1948 | Dennis | 340—61 |
| 3,012,225 | 12/1961 | Holt et al. | 340—61 |

JOHN W. CALDWELL, *Primary Examiner.*

ALVIN H. WARING, *Assistant Examiner.*